United States Patent
Yu et al.

(10) Patent No.: US 11,016,689 B2
(45) Date of Patent: May 25, 2021

(54) DATA STORAGE SYSTEM

(71) Applicant: Samsung Electronics Co., Ltd., Suwon-si (KR)

(72) Inventors: Geun Yeong Yu, Seongnam-si (KR); Beom Kyu Shin, Seongnam-si (KR); Myung Kyu Lee, Seoul (KR); Jun Jin Kong, Yongin-si (KR); Hong Rak Son, Anyang-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 146 days.

(21) Appl. No.: 15/696,443

(22) Filed: Sep. 6, 2017

(65) Prior Publication Data

US 2018/0088856 A1    Mar. 29, 2018

(30) Foreign Application Priority Data

Sep. 27, 2016  (KR) .................. 10-2016-0123753

(51) Int. Cl.
 *G06F 3/06*   (2006.01)
(52) U.S. Cl.
 CPC .......... *G06F 3/0644* (2013.01); *G06F 3/0604* (2013.01); *G06F 3/0614* (2013.01); *G06F 3/0647* (2013.01); *G06F 3/0688* (2013.01); *G06F 3/0689* (2013.01)
(58) Field of Classification Search
 None
 See application file for complete search history.

(56) References Cited

U.S. PATENT DOCUMENTS

| | | | |
|---|---|---|---|
| 8,185,784 B2 | 5/2012 | McCombs et al. | |
| 8,656,257 B1 | 2/2014 | Micheloni et al. | |
| 8,775,868 B2 | 7/2014 | Colgrove et al. | |
| 8,953,398 B2 | 2/2015 | Lee et al. | |
| 9,304,685 B2 | 4/2016 | Hashimoto et al. | |
| 2009/0271657 A1* | 10/2009 | McCombs ............ | G06F 11/004 714/6.2 |
| 2010/0125695 A1 | 5/2010 | Wu et al. | |
| 2010/0332729 A1* | 12/2010 | Alrod .................. | G06F 11/1068 711/103 |

(Continued)

OTHER PUBLICATIONS

Pletka, Roman, et al., "Holistic Flash Management for Next Generation All-Flash Arrays," Flash Memery Summit, California, 2015, pp. 1-17.

*Primary Examiner* — Sean D Rossiter
*Assistant Examiner* — Stephanie Wu
(74) *Attorney, Agent, or Firm* — Harness, Dickey & Pierce, P.L.C.

(57) ABSTRACT

A data storage system that provides improved reliability and performance comprises a first memory device including a plurality of first storage components and a first memory controller, the first memory controller controls operation of the first storage components, a second memory device including a plurality of second storage components and a second memory controller, the second memory controller controls operation of the second storage components, a grading device determining grades for each of the first storage components and the second storage components, and a system controller that the location of data based on the grades of the first storage components and the second storage components.

18 Claims, 14 Drawing Sheets

(56) References Cited

U.S. PATENT DOCUMENTS

| | | | |
|---|---|---|---|
| 2013/0326269 A1* | 12/2013 | Losh | G06F 11/2053 |
| | | | 714/6.13 |
| 2013/0336059 A1* | 12/2013 | Lee | G11C 29/82 |
| | | | 365/185.09 |
| 2015/0043282 A1* | 2/2015 | Shin | G11C 16/3495 |
| | | | 365/185.21 |
| 2015/0113203 A1* | 4/2015 | Dancho | G06F 3/0616 |
| | | | 711/102 |
| 2015/0143027 A1 | 5/2015 | Luo et al. | |
| 2016/0110249 A1* | 4/2016 | Orme | G06F 12/0238 |
| | | | 714/6.24 |
| 2016/0110255 A1 | 4/2016 | Yun | |
| 2017/0003880 A1* | 1/2017 | Fisher | G06F 3/061 |
| 2017/0052742 A1* | 2/2017 | Hassan | G06F 3/0611 |
| 2017/0091028 A1* | 3/2017 | Golan | G11C 29/028 |
| 2018/0046538 A1* | 2/2018 | Zhang | G06F 3/0604 |

\* cited by examiner

DATA STORAGE SYSTEM

This U.S. non-provisional application claims the benefit of priority under 35 U.S.C. § 119 to Korean Patent Application No. 10-2016-0123753, filed on Sep. 27, 2016 in the Korean Intellectual Property Office (KIPO), the disclosure of which is incorporated herein by reference in its entirety.

BACKGROUND

1. Field

Various example embodiments relate to a data storage system, a data storage apparatus, a data storage method, and/or non-transitory computer readable media for the same.

2. Description of the Related Art

Redundant array of inexpensive disks (RAID), which are commonly used for storage media system installed in, for example, servers that store important data. RAID systems store parity checks in one storage medium and restores data stored in another storage medium to normal data upon the occurrence of error in the data using the parity checks. By using RAID, balance can be achieved between input and output operations, and the general performance of serves can be improved.

Solid-state drives (SSDs), instead of hard disk drives (HDDs), are increasingly being used as storage media for servers. Semiconductor memories used in SSDs may be, for example, NAND flash memories. Since NAND flash memories are generally written and read in units of pages, RAID stripes are configured in the units of pages to apply RAID to NAND flash memories.

In the meantime, in a SSD, multiple semiconductor chips are mounted on a single die using surface mounter technology (SMT), and if any one of the multiple semiconductor chips does not operate properly, a hot swap function of the RAID system cannot be properly performed.

SUMMARY

Various example embodiments of the present disclosure provide a data storage system which allows a system controller to uniformly maintain the reliability of a stripe or multiple stripes using the grades of storage components.

Some example embodiments of the present disclosure also provide a data storage system which allows a system controller to reconfigure a stripe, using the grades of storage components, and thus to maintain the reliability of the stripe.

However, the example embodiments of the present disclosure are not restricted to those set forth herein. The above and other example embodiments of the present disclosure will become more apparent to one of ordinary skill in the art to which the present disclosure pertains by referencing the detailed description of the present disclosure given below.

According to some example embodiments of the present disclosure, there is provided a data storage system, including a first memory device including a plurality of first storage components and a first memory controller, the first memory controller configured to control operation of the first storage components, a second memory device including a plurality of second storage components and a second memory controller, the second memory controller configured to control an operation of the second storage components, a grading device configured to determine a reliability grade for each of the first storage components as first grade information and for each of the second storage components as second grade information, and a system controller configured to provide a write command for data comprising at least first and second sectors to the first memory controller and the second memory controller based on the first grade information and the second grade information, and determine a first location and a second location to write the first sector and the second sector, respectively, based on the first grade information, the second grade information, and a threshold value.

According to some example embodiments of the present disclosure, there is provided a data storage system, including a first memory device including a plurality of first storage components and a first memory controller, the first memory controller configured to control operation of the plurality of first storage components, a second memory device including a plurality of second storage components and a second memory controller, the second memory controller configured to control operation of the plurality of second storage components, a grading device configured to determine reliability grades of each of the plurality of the first storage components and each of the plurality of the second storage components, and a system controller configured to transmit a write command for first data to the first memory controller and the second memory controller by allocating first and second grades to first and second sectors, respectively, of the first data, wherein the first memory controller is further configured to receive the write command and write the first sector to a storage component with the first grade among the plurality of the first storage components, and the second memory controller is further configured to receive the write command and write the second sector to a storage component with the second grade among the plurality of the second storage components.

According to some example embodiments of the present disclosure, there is provided a data storage system including a plurality of solid state drives (SSDs) configured in a RAID system, the plurality of SSDs each including a plurality of semiconductor chips, at least one sensing circuit configured to determine reliability information associated with each of the semiconductor chips of the plurality of solid state drives, at least one grading circuit configured to determine a reliability grade for each of the plurality of semiconductor chips based on the reliability information associated with each of the plurality of semiconductor chips, and a system controller configured to write data associated with at least one RAID stripe to the plurality of semiconductor chips based on a desired total reliability grade for the data.

Other features and example embodiments may be apparent from the following detailed description, the drawings, and the claims.

BRIEF DESCRIPTION OF THE DRAWINGS

The above and other example embodiments and features of the present disclosure will become more apparent by describing in detail example embodiments thereof with reference to the attached drawings, in which.

DETAILED DESCRIPTION

Unless defined otherwise, all technical and scientific terms used herein have the same meaning as commonly understood by one of ordinary skill in the art to which this invention belongs. It is noted that the use of any and all examples, or exemplary terms provided herein is intended merely to better illuminate the invention and is not a limitation on the scope of the invention unless otherwise specified. Further, unless defined otherwise, all terms defined in generally used dictionaries may not be overly interpreted.

A data storage system according to some example embodiments of the present disclosure will hereinafter be described with reference to FIGS. 1 through 5.

Figure 1:
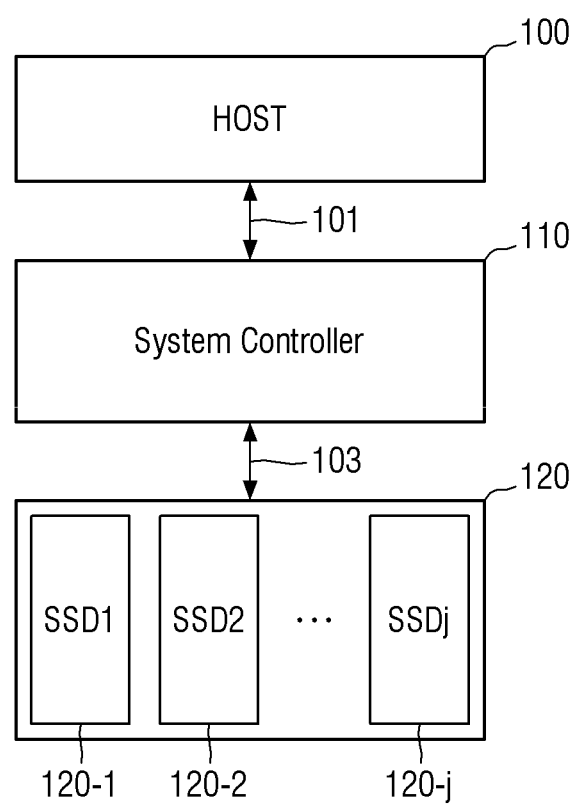
FIG. 1 is a block diagram of a data storage system according to some example embodiments of the present disclosure.
Figure 2:
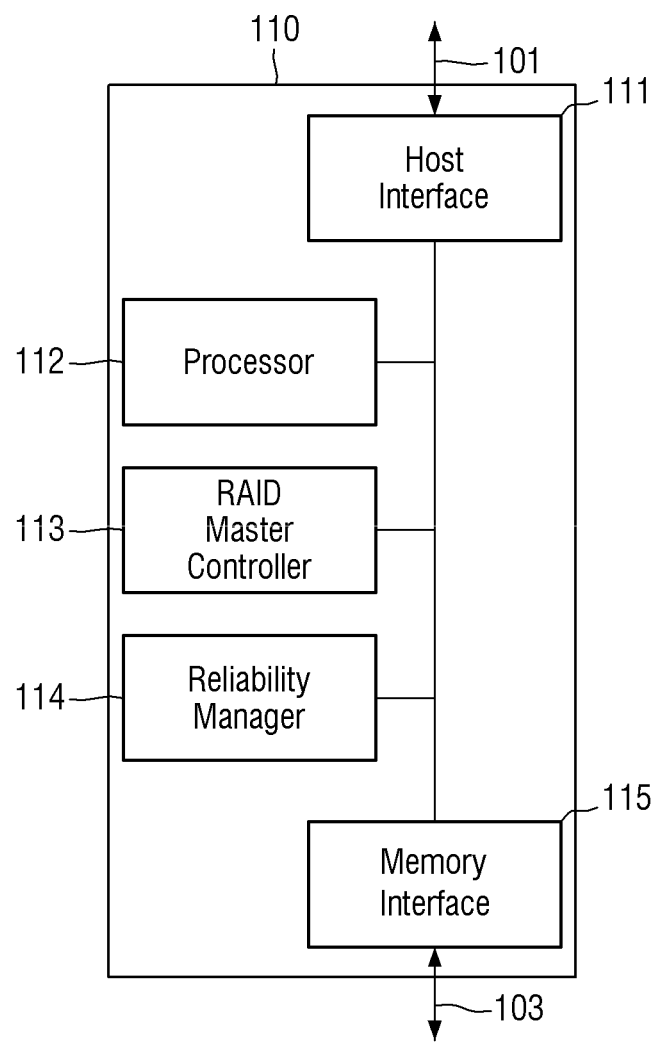
FIG. 2 is a block diagram of a system controller according to some example embodiments of the present disclosure.

FIG. 1 is a block diagram of a data storage system according to some example embodiments of the present disclosure. FIG. 2 is a block diagram of a system controller according to some example embodiments of the present disclosure.

Referring to FIGS. 1 and 2, the data storage system according to some example embodiments of the present disclosure may include a host 100, a system controller 110, and a memory unit group 120, etc., but is not limited thereto.

In some example embodiments, the system controller 110 and the memory unit group 120 (e.g., a memory device group) may be separate and independent from each other, and in other example embodiments, may be integrated with each other.

The system controller 110 may be coupled to the host 100 and the memory unit group 120. The system controller 110 may be configured to access the memory unit group 120 in response to a request from the host 100. The system controller 110 may communicate with the host 100 via a channel 101 (e.g., data channel and/or bus channel, etc.) between the host 100 and the system controller 110.

Also, the system controller 110 may communicate with the memory unit group 120 via a channel 103 (e.g., data channel and/or bus channel, etc.) between the memory unit group 120 and the system controller 110. While FIGS. 1 and 2 illustrate a single channel 103 provided between the memory unit group 120 and the system controller 110, the example embodiments are not limited thereto. For example, more than one channel 103 may be provided between the memory unit group 120 and the system controller 110.

The system controller 110 may be configured to provide an interface between the memory unit group 120 and the host 100. Also, the system controller 110 may be configured to, for example, run firmware for controlling the memory unit group 120.

The system controller 110 may be configured to, for example, control and/or perform read, write, erase, and/or background operations, etc., of the memory unit group 120.

The system controller 110 may, for example, include a host interface 111, at least one processor 112, a redundant array of inexpensive disks (RAID) master controller 113, a reliability manager 114, and a memory interface 115, but the example embodiments are not limited thereto. That is, the system controller 110 may further include other elements such as a random access memory (RAM), etc.

According to at least one example embodiment, the elements of the system controller 110 may communicate with one another via a bus 116.

The host interface 111 may include a protocol for exchanging data between the host 100 and the system controller 110. For example, the system controller 110 may be configured to communicate with the host 100 via an interface protocol such as a universal serial bus (USB) protocol, a multimedia card (MMC) protocol, a peripheral component interconnection (PCI) protocol, a PCI-express (PCI-E) protocol, an advanced technology attachment (ATA) protocol, a serial-ATA protocol, a parallel-ATA protocol, a small computer small interface (SCSI) protocol, an enhanced small disk interface (ESDI) protocol, an integrated drive electronics (IDE) protocol, etc. Additionally, the system controller 100 may communicate with the host 100 over a network as part of a distributed storage system (e.g., a network storage system, a cloud network storage system, etc.).

In a case in which the system controller 110 further includes RAM memory, the RAM may be used as at least one of an operating memory of the processor 112, a cache memory between the memory unit group 120 and the host 100, and/or a buffer memory between the memory unit group 120 and the host 100. The processor 112 may, for example, control the general operation of the system controller 110.

The operations of the RAID master controller 113 and the reliability manager 114 will be described later in detail.

The system controller 110 may, for example, perform RAID configuration, input and output (I/O) operation, and/or recovery on the memory unit group 120. More specifically, the system controller 110 may perform RAID configuration, I/O operations, and/or recovery on the memory unit group 120 in units of stripes, the memory unit group 120 including a plurality of physical storage devices (e.g., SSD drives, hard drives, etc.). Even more specifically, the system controller 110 may perform external RAID recovery on the memory unit group 120 in units of stripes.

External RAID recovery and error correction code (ECC) techniques may be employed in the data storage system according to some example embodiments of the present disclosure, but the example embodiments are not limited thereto. That is, for example, internal RAID recovery and ECC techniques may also be employed in the data storage system according to some example embodiments of the present disclosure. The external RAID recovery technique includes storing RAID parity data in at least one of a plurality of independent semiconductor chips (on a single drive or across multiple drives) to recover the data, and the internal RAID recovery technique includes storing RAID parity data in one semiconductor chip to recover the data.

The memory unit group 120 may include j memory units (e.g., memory devices) (where j is a natural number), i.e., first through j-th 120-1 through 120-*j*. The first through j-th memory units 120-1 through 120-*j* may include first and second memory units 120-1 and 120-2. In some example embodiments, the j-th memory unit 120-*j* may be, for example, a spare memory unit, but the present disclosure is not limited thereto. For example, the memory unit group 120 may include the first through j-th memory units 120-1 through 120-*j* and may further include an additional memory unit to be used as a spare memory unit.

In some example embodiments, the system controller 110 and the memory unit group 120 may be integrated into a single semiconductor device. More specifically, the system controller 110 and the memory unit group 120 may be integrated into a single semiconductor device to form a memory card, a solid state drive (SSD), etc. For example, the system controller 110 and the memory unit group 120 may be integrated into a single semiconductor device to form a memory card such as a Personal Computer Memory Card International Association (PCMCIA) card, a CompactFlash (CF) card, a SmartMedia card (SMC), a memory stick, a MultiMedia Card (MMC), a reduced-size (RS) MMC, or a MMCmicro, a Secure Digital (SD) card, a miniSD card, a microSD card, a Secure Digital High Capacity (SDHC), or a Universal Flash Storage (UFS).

Additionally, the system controller 110 and the memory unit group 120 may be integrated into a single semiconductor device to form a semiconductor drive such as a SSD. In some example embodiments, the memory unit group 120 may include, for example, NAND memories. In a case in which the system controller 110 and the memory unit group 120 are integrated into a single semiconductor device to form an SSD, the operating speed of the host 100, which is connected to the memory unit group 120, may be considerably improved, but the present disclosure is not limited thereto. Additionally, according to other example embodiments, the system controller 110 and the memory unit group 120 may be configured to be physically separate and detachable from each other. In other example embodiments, the memory unit group 120 may be implemented as a plurality of semiconductor devices, such as a plurality of memory cards and/or a plurality of SSDs, etc.

The data storage system according to some example embodiments of the present disclosure may be provided as an ultra mobile PC (UMPC), a workstation, a net-book, a personal digital assistant (PDA), a personal computer (PC), a laptop computer, a tablet, a wireless phone, a mobile phone, a smart phone, an e-book, a portable multimedia player (PMP), a portable game device, a personal navigation device, a black box, a digital camera, a smart television, a 3-dimensional (3D) television, a digital audio recorder, a digital audio player, a digital picture recorder, a digital picture player, a digital video recorder, a digital video player, an Internet of Things (IoT) device, a virtual reality device, an augmented reality device, an electronic personal assistant device, a device capable of transmitting and receiving data in an wireless environment, one of various electronic devices constituting a home network, one of various electronic devices constituting a computer network, one of various electronic devices constituting a telematics network, a radio-frequency identification (RFID) device, and/or one of various elements constituting a computing system.

The memory unit group 120 may be packaged in various configurations. For example, the memory unit group 120 may be packaged by various methods such as a PoP (package on package), ball grid array (BGA), chip scale package (CSP), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), thin quad flat pack (TQFP), small outline (SOIC), shrink small outline package (SSOP), thin small outline (TSOP), thin quad flatpack (TQFP), system in package (SIP), multi chip package (MCP), wafer-level fabricated package (WFP), a wafer-level processed stack package (WSP) method, etc., but is not limited thereto.

The memory unit group 120 will hereinafter be described later with reference to FIGS. 3 and 4.

Figure 3:
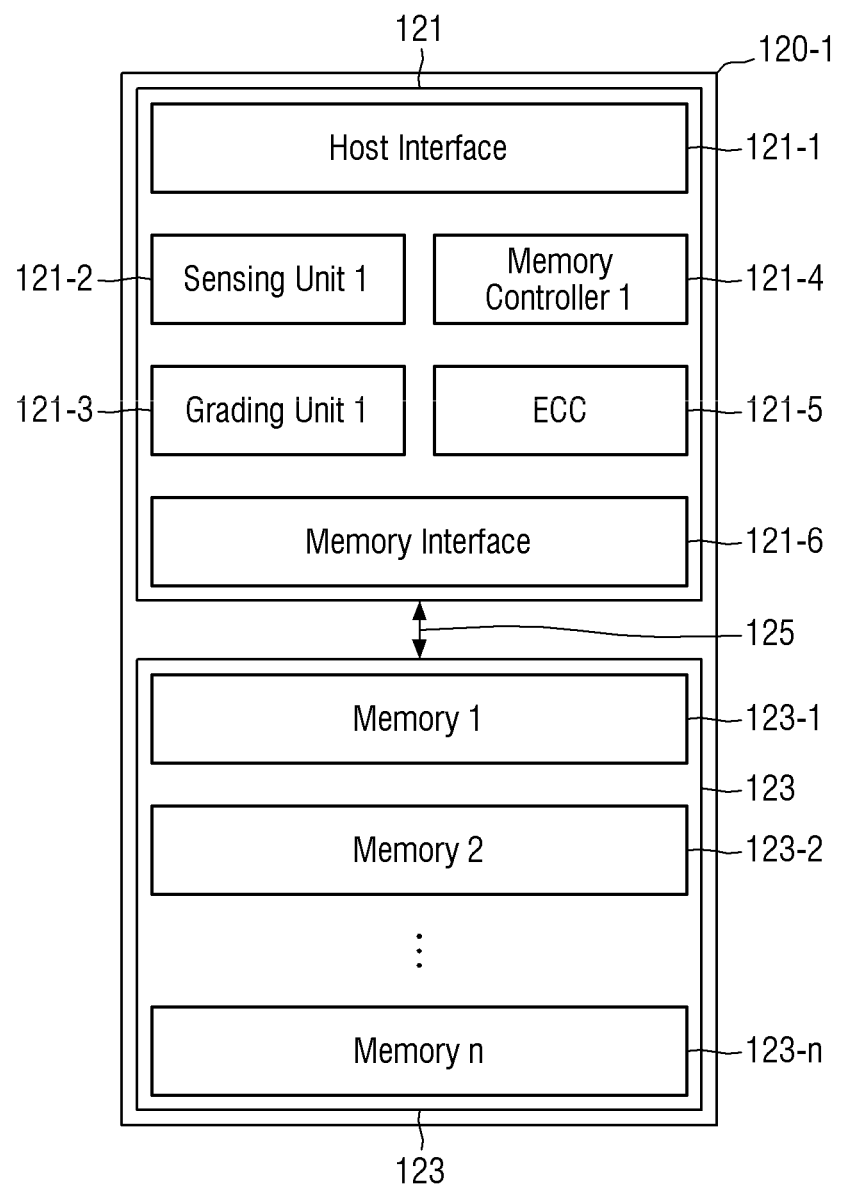
FIG. 3 is a block diagram of a memory unit according to some example embodiments of the present disclosure.

FIG. 3 is a block diagram of a memory unit according to some example embodiments of the present disclosure. FIG. 4 is a block diagram of a data storage system according to some example embodiments of the present disclosure.

Figure 4:
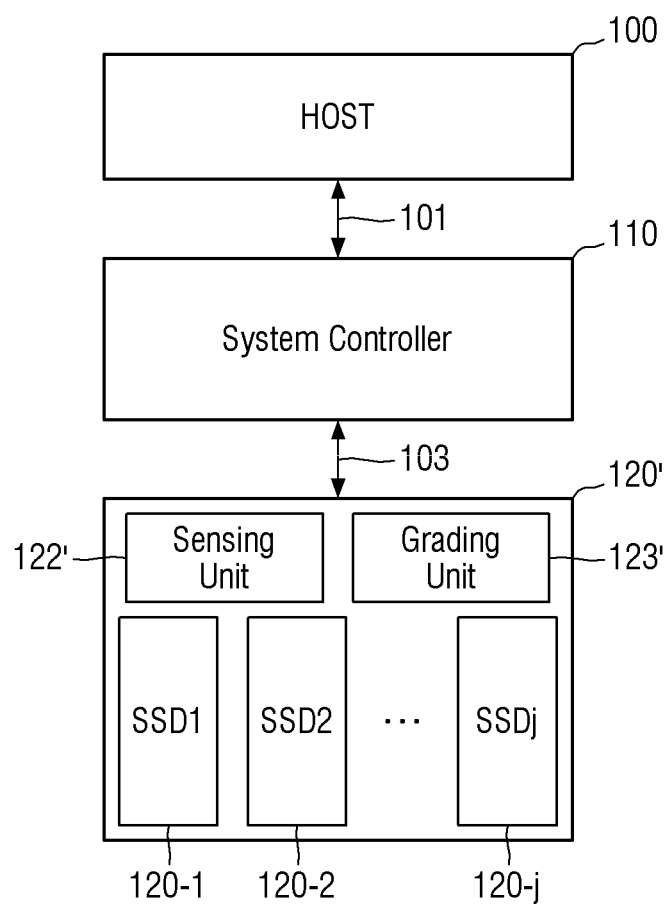
FIG. 4 is a block diagram of a data storage system according to some example embodiments of the present disclosure.

Referring to FIGS. 1, 3 and 4, each of the first through j-th memory units 120-1 through 120-*j* included in the memory unit group 120 may include a plurality of storage components. In some example embodiments, the storage components may be NAND memories, i.e., dies, but is not limited thereto. The first through j-th memory units 120-1 through 120-*j* will hereinafter be described, taking the first memory unit 120-1 as an example. The first through j-th memory units 120-1 through 120-*j* may have substantially the same elements and structure.

The first memory unit 120-1 may, for example, include a first memory part controller 121 and a first memory part 123.

The first memory part 123 may include a plurality of first storage components 123-1 through 123-*n* (where n is a natural number). In some example embodiments, the first storage components 123-1 through 123-*n* may be NAND memories, and the first memory unit 120-1 may be an SSD, but the example embodiments are not limited thereto. Each of the second through j-th memory units 120-2 through 120-*j*, like the first memory unit 120-1, may be an SSD and may include a plurality of storage components, which may be NAND memories, etc., but the example embodiments are not limited thereto. The first storage components 123-1 through 123-*n* may, for example, include magnetic tapes, magnetic disks, floppy disks, hard disks, optical disks, electrical erasable programmable read-only memories (EE-PROMs), flash memories, etc. Additionally, each of the first through j-th memory units 120-1 through 120-*j* included in the memory unit group 120 may be installed in one or more network devices and may be connected over a network as a distributed storage system (e.g., a network storage system, a cloud network storage system, etc.)

In some example embodiments, the storage components included in each of the first through j-th memory units 120-1 through 120-*j* may form a RAID system. A RAID system to which the present disclosure is applicable may have various levels. For example, the RAID system to which at least one example embodiment is applicable to may have any one of RAID level 0 (striped data sets without parity or mirroring (e.g., redundancy)), RAID level 1 (mirrored data sets without parity or mirroring), RAID level 2 (hamming code parity), RAID level 3 (striped set with dedicated parity, bit interleaved parity, or byte level parity), RAID level 4 (block level parity), RAID level 5 (striped data set with distributed parity or interleave parity), RAID level 6 (striped data set with dual distributed parity), RAID level 7, RAID level 10 and RAID level 53, etc., and/or a merged RAID level (e.g., RAID 0+1, RAID 1+0, RAID 5+0, RAID 5+1, or RAID 0+1+5) obtained by merging at least two of the above RAID levels.

The first memory part controller 121 may include a host interface 121-1, a sensing unit 121-2 (e.g., a sensing device and/or a sensing circuit), a first grading unit 121-3 (e.g., a grading device and/or grading circuit), a first memory controller 121-4, an ECC unit 121-5, and a memory interface 121-6, but the example embodiments are not limited thereto. That is, additional units (e.g., components, circuits, etc.) may be further provided in the first memory part controller 121, or some of the host interface 121-1, the sensing unit 121-2, the first grading unit 121-3, the first memory controller 121-4, the ECC unit 121-5, and the memory interface 121-6 may not be provided in the first memory part controller 121.

A sensing unit 122' and a grading unit 123' may, for example, be provided in a memory unit group 120' separately from first through j-th memory units 120-1 through 120-j. Additionally, the sensing unit 122' and the grading unit 123' may, for example, be included in at least one of the first through j-th memory units 120-1 through 120-j. Alternatively, the sensing unit 122' may not be provided.

The host interface 121-1, which is included in the first memory part controller 121, may, for example, provide an interface for communication between the first memory unit 120-1 and the system controller 110. The memory interface 121-6, which is included in the first memory part controller 121, may, for example, provide an interface for communication between the first memory part 123 and the first memory part controller 121. The ECC unit 121-5, which is included in the first memory part controller 121, may be configured to detect and correct error from data read from the first memory part 121, using ECC (error correction code).

The first memory controller 121-4 may control the operation of the first storage components 123-1 through 123-n. The first memory controller 121-4 may, for example, receive various commands from the system controller 110 and perform corresponding operations on the first storage components 123-1 through 123-n, such as read operations, write operations, etc.

For example, in a case in which the first memory controller 121-4 receives a write command from the system controller 110, the first memory controller 121-4 may write data to the first storage components 123-1 through 123-n. For example, in a case in which the first memory controller 121-4 receives a command to reconfigure a stripe (e.g., a RAID data stripe) from the system controller 110, the first memory controller 121-4 may relocate data to reconfigure a stripe. The operation of the first memory controller 121-4 will be described later in detail.

The first sensing unit 121-2 may collect various information generated during the input and/or output of data from the memory units of the memory unit group 120. For example, in a case in which an erase operation is performed within the first memory unit 120-1, the first sensing unit 121-1 may collect information regarding the number of times each block has been erased. As another example, in a case in which a write operation is performed within the first memory unit 120-1, the first sensing unit 121-1 may collect information regarding the number of errors that have occurred in storage components (e.g., each semiconductor device, the memory units, the storage devices, etc.) that have already been subjected to a write operation. For example, the first sensing unit 121-1 may also collect bit error rate information of each wordline or each block of each individual storage component. However, the type of information collected by the first sensing unit 121-2 is not particularly limited. In some example embodiments, the first sensing unit 121-2 may collect information generated during the input and/or output of data without being subjected to a test for collecting particular information.

In some example embodiments, in a case in which a sensing unit is provided separately from the first through j-th memory units 120-1 through 120-j, the sensing unit may collect various information generated during the input of data to and/or the output of data from, the first through j-th memory units 120-1 through 120-j.

The first grading unit 121-3 may determine the grade (e.g., reliability grade information, etc.) of each of the storage components 123-1 through 123-n based on the information collected by the first sensing unit 121-2. In some example embodiments, in a case in which a grading unit is provided separately from the first through j-th memory units 120-1 through 120-j, the grading unit may determine the grade of each of the storage components included in each of the first through j-th memory units 120-1 through 120-j.

In some example embodiments, the first grading unit 121-3 may determine the grade of each of the first storage components 123-1 through 123-n without being subjected to a test. The operation of the first grading unit 121-3 will hereinafter be described with reference to FIG. 5.

Figure 5:
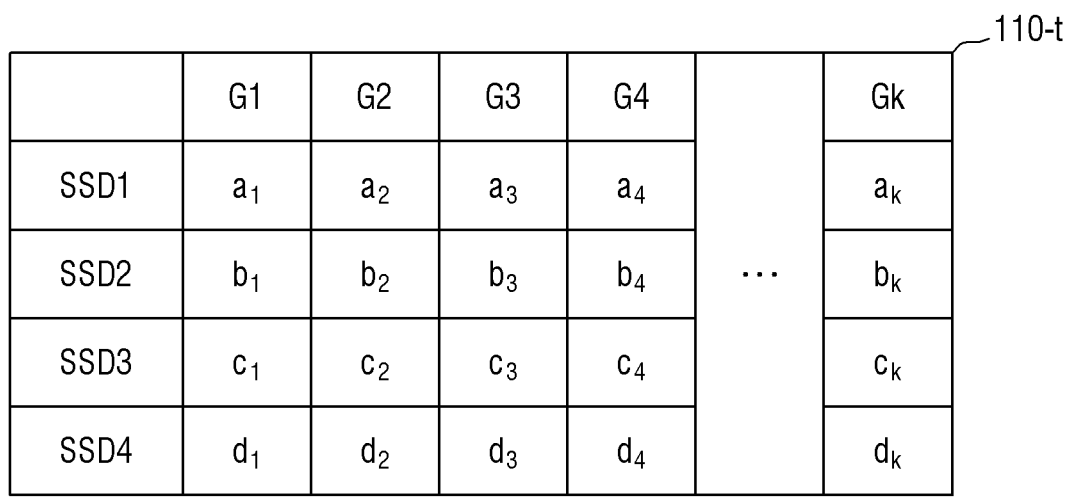
FIG. 5 shows a grade table according to some example embodiments of the present disclosure.

FIG. 5 shows a grade table according to some example embodiments of the present disclosure.

Referring to FIGS. 1 through 5, a grade table 110-t shows the percentage of storage components having each grade in each of the first through j-th memory units 120-1 through 120-j. More specifically, FIG. 5 shows the percentage of storage components having each grade in each of the first through fourth memory units 120-1 through 120-4.

There may be, for example, k grades (where k is a natural number), i.e., first through k-th grades G1 through Gk, for the first grading unit 121-3 to choose from as the grade of each of the first storage components 123-1 through 123-n. The first grading unit 121-3 may, for example, determine one of the first through k-th grades G1 through Gk as the grade of each of the first storage components 123-1 through 123-n.

The first through k-th grades G1 through Gk may have different scores from one another. For example, the first grade G1, which is a grade indicating that a storage component has the highest reliability rating, may have a score of 1. For example, the fourth grade G4, which has a lower reliability rating than the first grade G1, may have a score of 10. However, the example embodiments are not limited thereto and these grade scores are for illustrative purposes only.

Once the first grading unit 121-3 determines the grade of each of the first storage components 123-1 through 123-n based on experiential data of the storage components, testing of the storage components, historical data of the storage components and/or storage component types, and/or predictive values for the storage components, etc., the first grading unit 121-3 may transmit the determined grade of each of the first storage components 123-1 through 123-n to the first memory controller 121-4. If grade information of the first through j-th memory units 120-1 through 120-j is needed, the system controller 110 may send a request for the grade information of the first through j-th memory units 120-1 through 120-j to the first memory controller 121-4. The first memory controller 121-4 may receive the request for the grade information of the first through j-th memory units 120-1 through 120-j and may transmit the grades determined by the first grading unit 121-3 to the system controller 110.

In some example embodiments, the first grading unit 121-3 may periodically determine the grade of each of the first storage components 123-1 through 123-n and may transmit the determined grade of each of the first storage components 123-1 through 123-n to the first memory controller 121-4, in which case, the grade table 110-t may be periodically updated.

In some example embodiments, the reliability manager 114 of the system controller 110 may send a request for grade information to the first memory controller 121-4. The reliability manager 114 may receive the grade of each of the first storage components 123-1 through 123-n from the first memory controller 121-4. The grade information received by the reliability manager 114 may be, for example, the percentage of storage components having each grade in each of the first through j-th memory units 120-1 through 120-j.

More specifically, the system controller 110 may have the grade table 110-t. The grade information transmitted to the system controller 110 by the first memory controller 121-4 may be the percentage of storage components having each grade in each of the first through j-th memory units 120-1 through 120-j. Referring to the grade table 110-t, a1 represents the percentage of first storage components having the first grade G1 in the first memory unit 120-1 (or "SSD1"), and a1 through dk may all be identical or may differ from one another.

For example, the percentage of storage components having the first grade G1 in the first memory unit 120-1 (or "SSD1") may be a1%, and the percentage of storage components having the second grade G2 in the first memory unit 120-1 (or "SSD1") may be a2%.

The first memory controller 121-4 may transmit some and/or all of the grade information to the system controller 110 depending on a request from the system controller 110.

A data storage system according to some example embodiments of the present disclosure will hereinafter be described with reference to FIGS. 1, 2, 6, and 7, avoiding redundant descriptions for clarity purposes.

Figure 6:
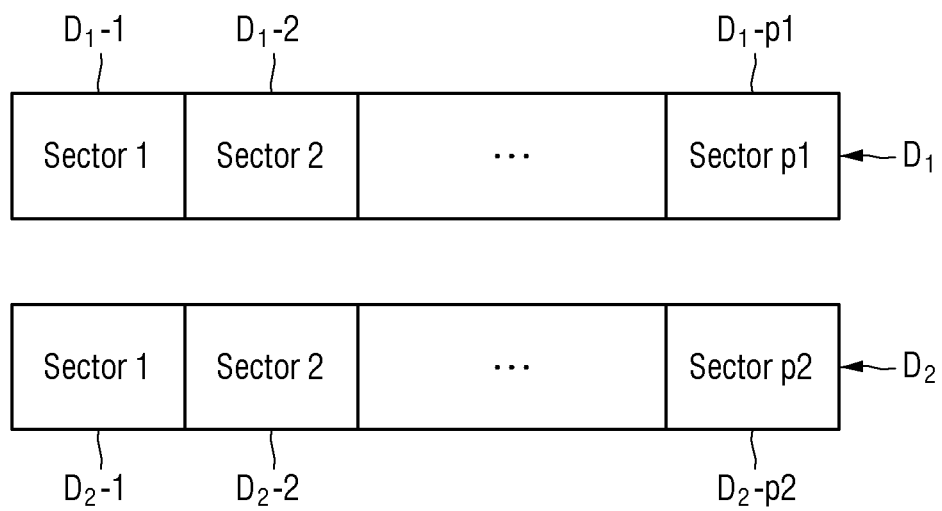
FIG. 6 illustrates the structure of data according to some example embodiments of the present disclosure.
Figure 7:
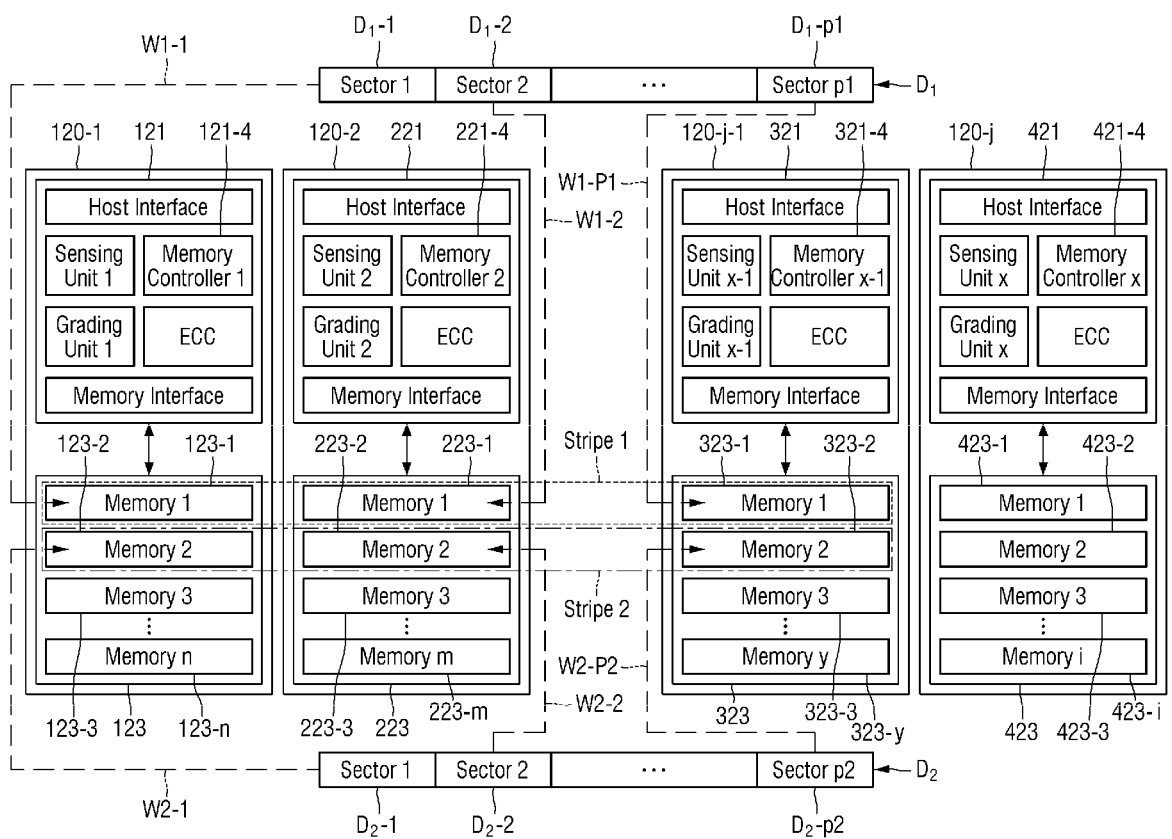
FIG. 7 illustrates configuring stripes by storing data in a data storage system according to some example embodiments of the present disclosure.

FIG. 6 illustrates the structure of data according to some example embodiments of the present disclosure. FIG. 7 illustrates configuring stripes by storing data in a data storage system according to some example embodiments of the present disclosure.

Referring to FIGS. 1, 2, 6, and 7, first and second data D1 and D2 may be stored in a plurality of memory units of the data storage system according to some example embodiments of the present disclosure and may thus form first and second stripes Stripe 1 and Stripe 2, respectively. While two stripes are illustrated in FIG. 6, the example embodiments are not limited thereto and may include any number of stripes supported by the RAID configuration.

In the description that follows, it is assumed that the data storage system according to some example embodiments of the present disclosure has RAID level 2 or higher, but the example embodiments are not limited thereto. The manner in which data is stored in the data storage system according to some example embodiments of the present disclosure may be modified as necessary.

The second memory unit 120-2 may be separate from the first memory unit 120-1. The second memory unit 120-2 may include a second memory part controller 221 and a second memory part 223. The second memory part controller 221 may include a second memory controller 221-4. The second memory part 223 may include a plurality of second storage components 223-1 through 223-m, with m being a natural number.

The second memory controller 221-4 may control the operation of the second storage components 223-1 through 223-m. A second grading unit may, for example, be included in the second memory part controller 221. The second grading unit may determine the grade of each of the second storage components 223-1 through 223-m.

The second grading unit may transmit grade information (e.g., reliability grade information) of each of the second storage components 223-1 through 223-m to the system controller 110.

The structure, and the functions of the elements, of the second memory unit 120-2 may be substantially the same as the structure, and the functions of the elements, of the first memory unit 120-1.

The structure, and the functions of the elements, of each of the (j−1)-th and j-th memory units 120-j−1 and 120-j may also be substantially identical to the structure, and the functions of the elements, of the first memory unit 120-1.

In some example embodiments, the j-th memory unit 120-j may serve as a spare memory unit, and this will be described later in detail.

The first data D1 may include first through p1-th sectors D1-1 through D1-p1, where p is a natural number. The second data D2 may include first through p2-th sectors D2-1 through D2-p2. A sector (e.g., data sector) may be a basic unit of data that can be stored in a single storage component, or in other words, is the size of a minimum data storage unit that may be stored on the storage component.

First through x-th memory controllers 121-4 through 421-4 may receive the first and second data D1 and D2 from the system controller 110. For example, the first memory controller 121-4 may receive a write command for the first sector D1-1 of the first data D1 from the system controller 110. For example, the second memory controller 221-4 may receive a write command for the first sector D2-1 of the first data D1 from the system controller 110.

The first and second memory controllers 121-4 and 221-4 may receive a write command and may store the first and second sectors D1-1 and D2-1 of the first data D1 in one of the first storage components 123-1 through 123-n and one of the second components 223-1 through 223-m, respectively, and this will be described later in detail.

A sector may be stored in one storage component of the plurality of storage components included in a desired stripe according to at least one example embodiment. For example, the first sector D1-1 of the first data D1 may be stored (e.g., W1-1) in a fourth storage component 123-1 of the first memory unit 120-1. The fourth storage component 123-1 may be one of the first storage components 123-1 through 123-n. For example, the second sector D1-2 of the first data D1 may be stored (e.g., W1-2) in a sixth storage component 223-1 of the second memory unit 120-2. The sixth storage component 223-1 may be one of the second storage components 223-1 through 223-m. For example, the p1-th sector D1-p1 of the first data D1 may be stored (e.g., W1-p1) in a tenth storage component 323-1 of the (j−1)-th memory unit 120-j−1. The tenth storage component 323-1 may be one of the (j−1)-th storage components 323-1 through 323-y.

The fourth, sixth, and tenth storage components 123-1, 223-1, and 323-1 to which the first data D1 is written may form the first stripe Stripe 1.

For example, the first sector D2-1 of the second data D2 may be stored (e.g., W2-1) in a fifth storage component 123-2 of the first memory unit 120-1. The fifth storage component 123-2 may be one of the first storage components 123-1 through 123-n. For example, the second sector D2-2 of the second data D2 may be stored (e.g., W2-2) in a seventh storage component 223-2 of the second memory unit 120-2. The seventh storage component 223-2 may be one of the second storage components 223-1 through 223-$m$. For example, the p2-th sector D2-p2 of the second data D2 may be stored (e.g., W2-p2) in an eleventh storage component 323-2 of the (j−1)-th memory unit 120-$j$−1. The eleventh storage component 323-2 may be one of the (j−1)-th storage components 323-1 through 323-$y$.

The fifth, eighth, and eleventh storage component 123-2, 223-2, and 323-2 to which the second data D2 is written may form the second stripe Stripe 2.

In some example embodiments, the first and second data D1 and D2 may include ECC. ECC (e.g., error correcting code) may be code for detecting any loss, and/or error in continuous data and may provide for the recovery of the data error and/or data loss. ECC may be inserted, as parity bit(s), for every particular data unit. Accordingly, data may include parity bits and non-parity bits.

The first through x-th memory controllers 121-4 through 421-4 may generate one or more RAID parities using data. The RAID parities may be used to determine whether error has occurred in an RAID process in which a plurality of disks are connected and used in parallel. One or more than one, RAID parity (e.g., parity drive) may be used depending on the type of RAID method used. One RAID parity may be copied several times. RAID technology is already well known in the art to which the present disclosure pertains, and thus, a detailed description thereof will be omitted.

The first memory unit 120-1 may include n storage components 123-1 through 123-$n$. The second memory unit 120-2 may include m storage components 223-1 through 223-$m$ (where m is a natural number). The (j−1)-th memory unit 120-$j$−1 may include y storage components 323-1 through 323-$y$ (where y is a natural number). The j-th memory unit 120-$j$ may include i storage components (where i is a natural number), i.e., storage components 423-1 through 423-$i$.

In some example embodiments, n, m, x, y, and i may all be identical, but the example embodiments are not limited thereto. For example, n, m, x, y, and i may all differ from one another. In another example, some of n, m, x, y, and i may be identical, and the others may differ from one another. For example, n, m, y, and i may be identical, but x may differ from n, m, y, and i.

The system controller 110 may control the grade sum of each stripe, which is the sum of the grades of storage components forming a corresponding stripe, to be equal to, or less than, a desired threshold value.

The grade sum of a stripe may be the sum of the scores of the grades of the storage components forming the stripe. For example, the grade sum of the first stripe Stripe 1 may be the sum of the scores of the grades of the fourth, sixth, and tenth storage components 123-1, 223-1, and 323-1.

For example, it is assumed that the fourth and sixth storage components 123-1 and 223-1 have the first grade G1, which corresponds to a score of 1, and the tenth storage component 323-1 has the second grade G2, which corresponds to a score of 2. If the first data D1 includes only the first sector D1-1, the second sector D1-2, and the p1-th sector D1-p1, the grade sum of the first stripe Stripe 1 may be 4 (e.g., =1+1+2).

In some example embodiments, the RAID master controller 113 of the system controller 110 may calculate the grade sum of each stripe. For example, the reliability manager 114, which receives grade information of storage components from the first through x-th memory controllers 121-4 through 421-4, may control the RAID master controller 113 to calculate the grade sum of each stripe.

The reliability manager 114 may command the RAID master controller 113 to calculate the grade sums of all stripes stored in the data storage system according to some example embodiments of the present disclosure. Additionally, the reliability manager 114 may command the RAID master controller 113 to calculate the grade sums of only some of the stripes stored in the data storage system according to some example embodiments of the present disclosure.

The system controller 110 may, for example, control the grade sums of the first and second stripes Stripe 1 and Stripe 2 to be equal to, or less than, the desired threshold value. The threshold value may be an arbitrary value determined, in advance or in real-time, for the maintenance of the reliability of the data storage system according to some example embodiments of the present disclosure.

A data storage system according to some example embodiments of the present disclosure will hereinafter be described with reference to FIGS. 1 and 6 through 8, avoiding redundant descriptions for clarity purposes.

Figure 8:
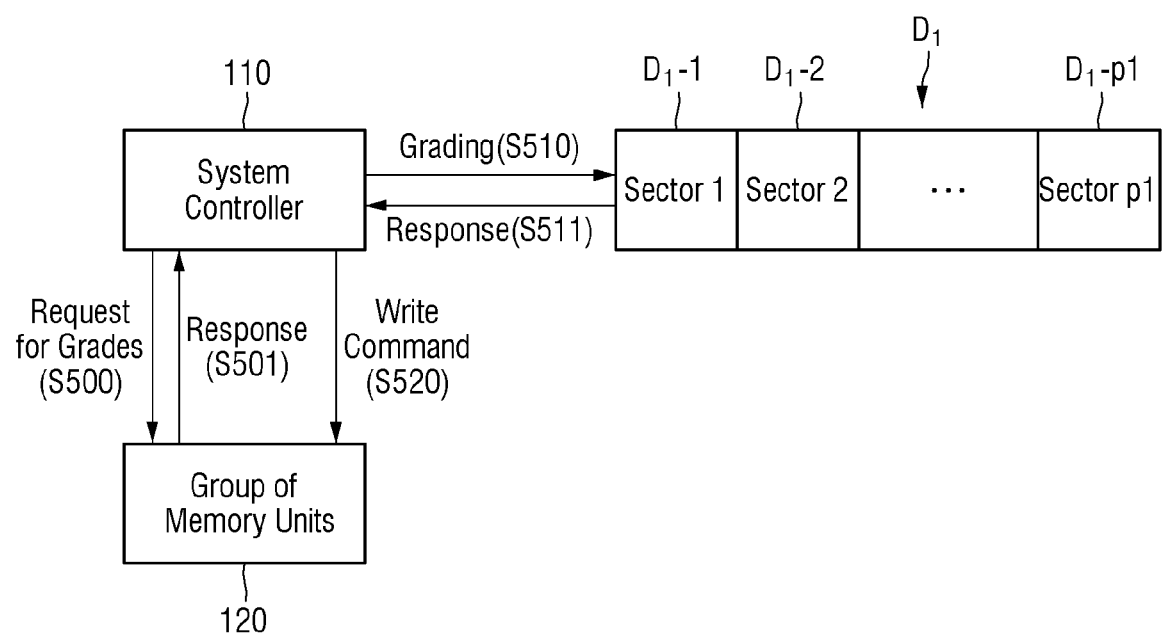
FIG. 8 illustrates storing data in storage components in a data storage system according to some example embodiments of the present disclosure.

FIG. 8 illustrates storing data in storage components in a data storage system according to some example embodiments of the present disclosure.

Referring to FIGS. 1 and 6 through 8, the system controller 110 may control the grade sum of each stripe to be equal to, or less than or more than, the desired threshold value, but is not limited thereto.

In S500, the system controller 110 may send a request for grade information of storage components to the memory unit group 120. In some example embodiments, S500 may be performed before steps of storing data in storage components to configure a stripe. Also, before S500, a grading unit (or first through x-th grading units included in the first through j-th memory units 120-1 through 120-$j$) may determine the grades (e.g., may dynamically determine the grades and/or determine the grades in real-time) of the storage components based on the status of the storage components (e.g., the real-time status of the storage components).

In S501, the first through x-th memory controllers 121-4 through 421-4 may transmit grade information of all or some of the storage components to the system controller 110. More specifically, as mentioned above with reference to FIG. 5, the grade information transmitted by the first through x-th memory controllers 121-4 through 421-4 may be the percentage of storage components having each grade in each of the first through j-th memory units 120-1 through 120-$j$.

In S510 and S511, the system controller 110 may determine the data grade of each of the sectors of the first data D1 based on the grade information received from the first through x-th memory controllers 121-4 through 421-4. In some example embodiments, data grades and grades that can be allocated to the storage components may have the same system. For example, a first data grade may be the same as the first grade G1 and may have the same score as the first grade G1.

The system controller 110 may, for example, allocate the first data grade to the first sector D1-1 of the first data D1, and may allocate the second data grade to the second sector D2-1 of the first data D1 based on the percentage of storage components having each grade in each of the first through j-th memory units 120-1 through 120-$j$, but the example embodiments are not limited thereto. Additionally, the same data grade may be allocated to all of the sectors of the first data D1 based on the percentage of storage components having each grade in each of the first through j-th memory units 120-1 through 120-$j$, or the data grade may be based on an average (e.g., mean) grade, median grade, and/or mode grade, of all of the storage components that are included in the desired sector and/or desired stripe, etc.

In a case in which a stripe is configured by allocating a data grade to each of the sectors of the first data D1 and storing the first data D1 in the first through j-th memory units 120-1 through 120-j, the system controller 110 may control the grade sum of the stripe to be equal to, or less than or more than, the desired threshold value. In other words, the system controller 110 may control the sum of the grades allocated in each of the sectors of the first data D1 to be based on a desired threshold value.

In S520, the system controller 110 may transmit a write command for the first data D1 with data grades allocated thereto to the first through x-th memory controllers 121-4 through 421-4.

For example, the system controller 110 may transmit a write command, a read command, etc., for the first sector D1-1 of the first data D1, to which the first data grade is allocated, to the first memory controller 121-4.

The first memory controller 121-4 may receive the write command transmitted by the system controller 110 and may search for and find a storage component having the same grade as the first data grade, i.e., the first grade G1, from among the first storage components 123-1 through 123-n. Then, the first memory controller 121-4 may write the first sector D1-1 of the first data D1 to the found storage component.

For example, in a case in which the fourth storage component 123-1 has the first grade G1, the first memory controller 121-4 may write the first sector D1-1 of the first data D1 to the fourth storage component 123-1.

Similarly, the second memory controller 221-4 may store the second sector D1-2 of the first data D1 in a storage component having the same grade as the data grade allocated to the second sector D1-2 of the first data D1 by the system controller 110.

The grade sum of the first stripe Stripe 1, i.e., the sum of the data grades of the sectors of the first data D1 that are stored in respective storage components to form the first stripe Stripe 1, may be equal to, less than, or greater than, the desired threshold value, or in other words, the sum of the data grades of the sectors of the first data D1 may be based on the desired threshold value. Assuming that the grades are better the lower they are (to which the example embodiments are not limited to), if the grade sum of the first stripe Stripe 1 is equal to, or less than, the desired threshold value, it means that the data storage system according to some example embodiments of the present disclosure are expected to operate properly and reliably based on the determined reliability grade of the underlying storage components that make up the data storage system. On the other hand, if the grade sum of the first stripe Stripe 1 exceeds the desired threshold value, it means that the data storage system according to some example embodiments of the present disclosure may not be able to operate properly and reliably (for example, some of the functionality of the first through j-th memory units 120-1 through 120-j may be reduced, errors may be expected to occur at a higher than normal rate, and/or data written to some storage components may be lost). Additionally, the grade sum of the stripes of the data storage system may represent the wear and tear on the individual storage components (e.g., number of writes/rewrites to flash memory cells), approach of the expected life expectancy of the individual storage components, and/or manufacturing defects present in the individual storage components, etc.

The data storage system according to some example embodiments of the present disclosure can maintain reliability among the first through j-th memory units 120-1 through 120-j (or among the first through (j−1)-th memory units 120-1 through 120-j−1), which form the RAID data stripes, by allocating data grades to sectors of data for each stripe based on grade information of storage components before writing data to the storage components. In other words, the data storage system according to some example embodiments may provide RAID data stripes of a consistent quality and/or reliability level based on the (dynamic) data grades of the sectors of data that comprise the data storage system, and based on the data grades, may (dynamically) reallocate the assignment of data sectors to some or all of the RAID data stripes to ensure that the desired data grade, quality level, and/or reliability level is maintained throughout the use and life of the data storage system.

Also, the data storage system according to some example embodiments of the present disclosure can maintain reliability among the first through j-th memory units 120-1 through 120-j (or among the first through (j−1)-th memory units 120-1 through 120-j−1), which form stripes, by translating internal information of each of the first through j-th memory units 120-1 through 120-j into grade information and allowing the system controller 110, which is separate from the memory unit group 120, to use the grade information to determine the memory units that comprise (e.g., are assigned to) the stripes.

Also, the data storage system according to some example embodiments of the present disclosure can improve the reliability of storing data in RAID storage systems by allocating data grades to sectors of data before writing the data to storage components based on grade information of the storage components so as to configure a stripe with storage components with reliability.

A data storage system according to some example embodiments of the present disclosure will hereinafter be described with reference to FIGS. 1, 6, 7, and 9 through 11, avoiding redundant descriptions for clarity purposes.

Figure 9:
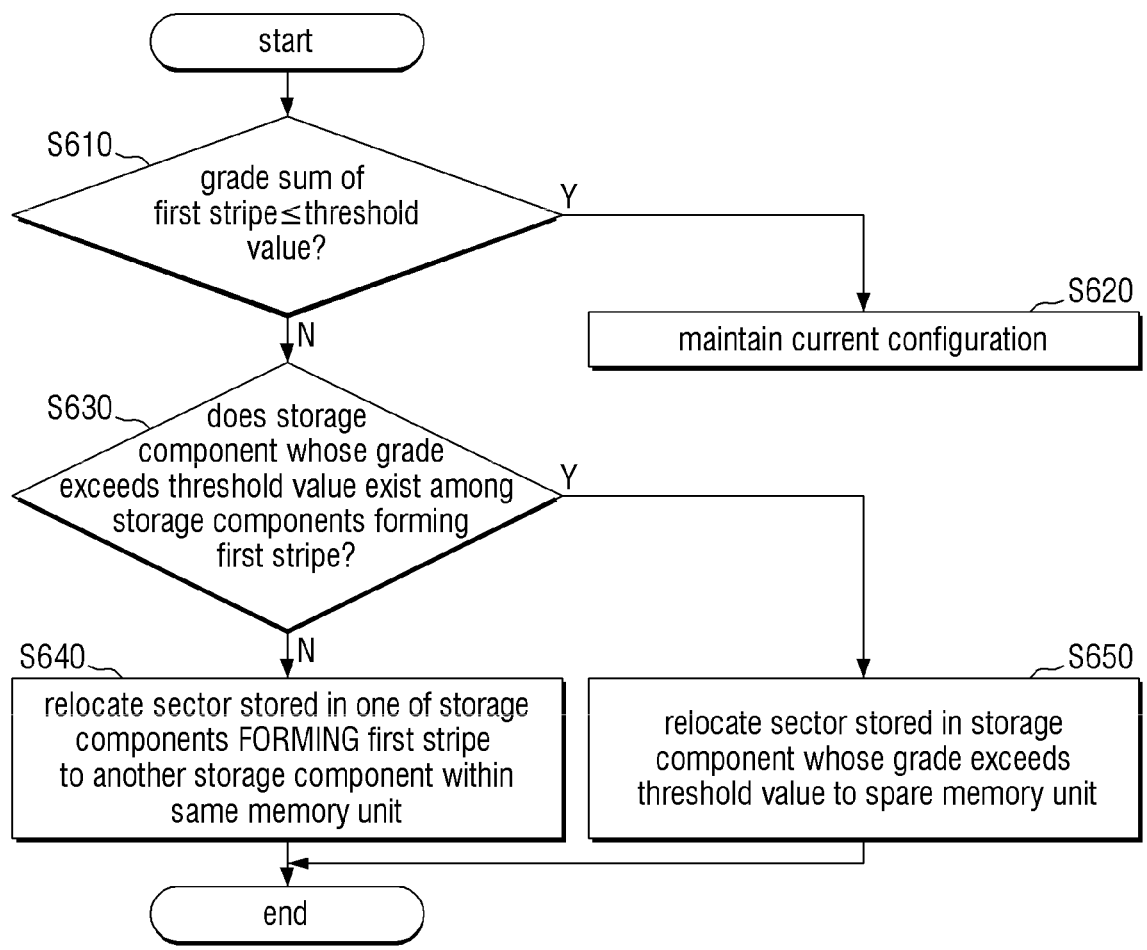
FIG. 9 is a flowchart illustrating how a data storage system according to some example embodiments of the present disclosure reconfigures a stripe.
Figure 10:
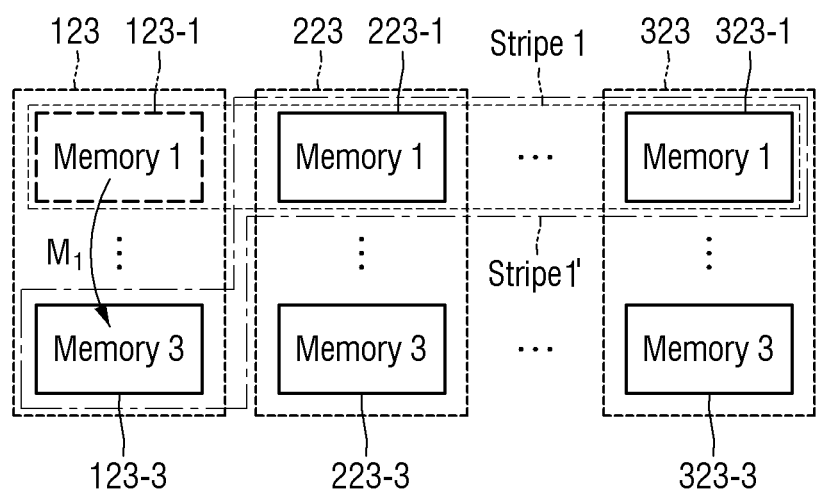
FIGS. 10 and 11 illustrate how a data storage system according to some example embodiments of the present disclosure reconfigures a stripe.
Figure 11:
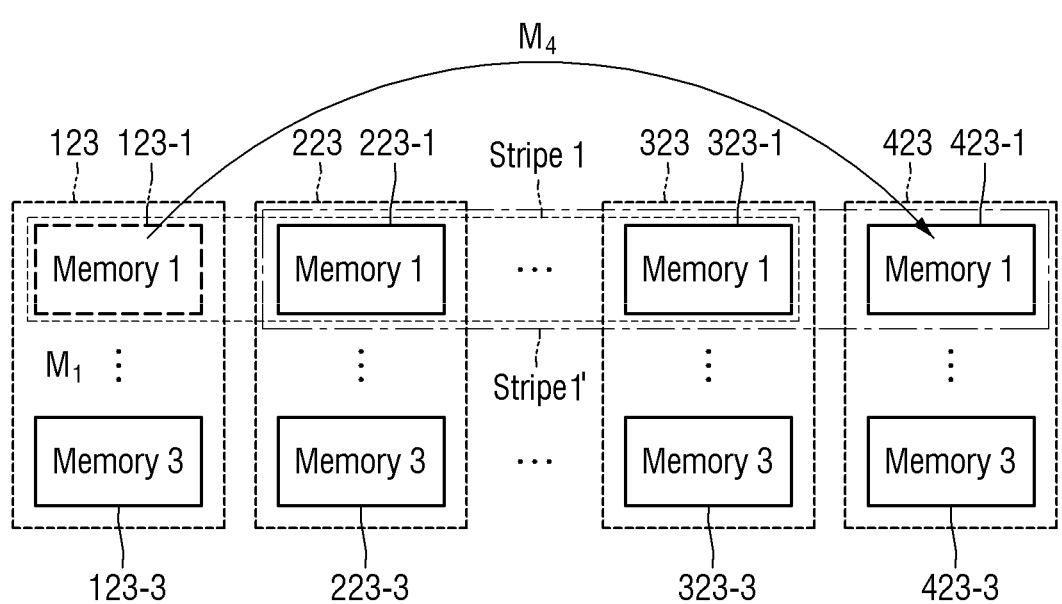

FIG. 9 is a flowchart illustrating how a data storage system according to some example embodiments of the present disclosure reconfigures a stripe. FIGS. 10 and 11 illustrate how a data storage system according to some example embodiments of the present disclosure reconfigures a stripe.

Referring to FIGS. 1, 6, 7, and 9 through 11, the system controller 110 may control the grade sum of each of a plurality of stripes stored in the data storage system according to some example embodiments of the present disclosure based on a desired threshold value.

In S610, the system controller 110 may issue a command to periodically, continuously, and/or on-demand update grade information of storage components to the first through x-th memory controllers 121-4 through 421-4.

The first through x-th memory controllers 121-4 through 421-4 may update (e.g., periodically, continuously, and/or at desired instances) and transmit the grade information of the storage components, which is provided (e.g., periodically, continuously, and/or at desired instances) by the first through x-th grading units, to the system controller 110. The information transmitted to the system controller 110 may include information regarding storage components forming each of the stripes stored in the data storage system according to some example embodiments of the present disclosure.

The system controller 110 may determine whether the grade sum of each of the stripes stored in the data storage system according to some example embodiments of the present disclosure exceeds the desired threshold value based on the information transmitted by the first through x-th memory controllers 121-4 through 421-4. The system controller 110 may inspect the grade sums of all the stripes stored in the data storage system according to some example embodiments of the present disclosure and/or may randomly inspect the grade sums of some arbitrary stripes among the stripes stored in the data storage system according to some example embodiments of the present disclosure. Additionally, the system controller 110 may inspect the grade sums of stripes that have been maintained for a long time without any changes in their configuration (e.g., the system controller 110 may inspect the grade sums of stripes that have not been reconfigured within a desired time frame). Additionally, the system controller 110 may inspect the grade sums of some of the stripes stored in the data storage system based on the amount of use of the stripes (e.g., read operations, write operations, etc.) according to some example embodiments of the present disclosure. Additionally, the system controller 110 may inspect the grade sums of all or some of stripes that are most often requested by the host 100 to be read. Additionally, the system controller 110 may inspect the grade sums of all or some of stripes based on the age of the storage components comprising the stripe according to some example embodiments of the present disclosure.

If the grade sum of the first stripe Stripe 1, which is one of the stripes stored in the data storage system according to some example embodiments of the present disclosure, is equal to, or less than, the desired threshold value (Y), the system controller 110 may maintain the current configuration of the first stripe Stripe 1 (S620).

If the grade sum of the first stripe Stripe 1, which is one of the stripes stored in the data storage system according to some example embodiments of the present disclosure, exceeds the desired threshold value (N), the system controller 110 determines whether there exists a storage component whose grade exceeds the desired threshold value among the storage components forming the first stripe Stripe 1 (S630).

The system controller 110 may periodically determine whether the grade sum of the first stripe Stripe 1 exceeds the desired threshold value based on the grade information of the storage components comprising Stripe 1, which is periodically updated. Additionally, the system controller 110 may continuously and/or at desired instances (e.g., based on a command from the host 100, etc.) determine whether the grade sum of the first stripe Stripe 1 exceeds the desired threshold value based on the grade information of the storage components comprising Stripe 1 according to some example embodiments.

If there does not exist a storage component whose grade exceeds the threshold value among the storage components forming the first stripe Stripe 1 (N), the system controller 110 may reconfigure the first stripe Stripe 1 (S640), as illustrated in FIG. 10.

The reconfiguration of the first stripe Stripe 1 in S640 may be performed, for example, when the grade of each of the fourth, sixth, and tenth storage components 123-1, 223-1, and 323-1 of the first stripe Stripe 1 does not exceed the threshold value, but the grade sum of the first stripe Stripe 1 exceeds the threshold value. Or in other words, even if the grade of one or more individual storage components of a stripe do not exceed a desired threshold value, the stripe may be reconfigured if the grade sum of the storage components of the stripe exceed the desired threshold value.

In some example embodiments, the system controller 110 may, for example, request that the first memory controller 121-4 reallocate (e.g., relocate) the first sector D1-1 of the first data D1, which is stored in the fourth storage component 123-1, to another storage component of the first memory unit 120-1, but the example embodiments are not limited thereto. For example, a storage component from which a sector of data present therein needs to be reallocated is not particularly limited to the fourth storage component 123-1, and one or more of the sectors of the first data D1 may be reallocated from their respective storage components. The system controller 110 may determine one or more storage components to which one or more of the sectors of the first sector D1-1 of the first data D1 are to be reallocated based on the grade information of the storage components.

For example, the system controller 110 may send a request M1 for the reallocation (e.g., relocation) of the first sector D1-1 of the first data D1 to an eighth storage component 123-3 to the first memory controller 121-4. Grade information of the eighth storage component 123-3 may be determined by the first grading unit and may already be transmitted to the system controller 110 by the first memory controller 121-4. The grade of the eighth storage component 123-3 may be equal to, or less than, the desired threshold value and the sum of the grade of the eighth storage component 123-3 and the grades of the sixth and tenth storage components 223-1 and 323-1 may not exceed the desired threshold value.

The first memory controller 121-4 may receive the request M1 and may reallocate (e.g., relocate) the first sector D1-1 of the first data D1 to the eighth storage component 123-3. Then, the first memory controller 121-4 may transmit a completion signal to the system controller 110.

Accordingly, the first stripe Stripe 1 may be reconfigured into a first stripe Stripe 1'. In other words, the first stripe Stripe 1' may include the eighth, sixth, and tenth storage components 123-3, 223-1, and 323-1. The grade sum of the first stripe Stripe 1' may be equal to, or less than the desired threshold value.

The data storage system according to some example embodiments of the present disclosure may check (e.g., periodically, continuously, on-demand, etc.) the grades of the storage components and may thus discover and reconfigure any stripe whose grade sum exceeds the threshold value. Accordingly, the reliability among the first through j-th memory units 120-1 through 120-*j* (or among the first through (j−1)-th memory units 120-1 through 120-*j*−1) may be maintained.

The data storage system according to some example embodiments of the present disclosure can improve the reliability of storing and maintaining data by reconfiguring any stripe with a reliability problem and/or experiencing errors or failure of one or more storage components based on grade information of storage components where data is stored.

After S630, if there exists exist a storage component whose grade exceeds the threshold value among the storage components forming the first stripe Stripe 1 (Y), the system controller 110 may reconfigure the first stripe Stripe 1 (S650), as illustrated in FIG. 11.

The reconfiguration of the first stripe Stripe 1 in S650 may be performed when the grade of any one of the fourth, sixth, and tenth storage components 123-1, 223-1, and 323-1 of the first stripe Stripe 1 exceeds the threshold value.

For example, if the grade of the fourth storage component 123-1 exceeds the threshold value, the first memory controller 121-4 may send a notification to the system controller 110. The system controller 110 may receive the notification and may send a request for information regarding the fourth storage component 123-1 to the first memory controller 121-4. The first memory controller 121-4 may receive the request sent by the system controller 110 and may transmit the information regarding the fourth storage component 123-1 to the system controller 110.

The system controller 110 may receive the information regarding the fourth storage component 123-1 and may send a request M4 for the reallocation (e.g., relocation) of the first sector D1-1 of the first data D1, which is stored in the fourth storage component 123-1, to a twelfth storage component 423-1 in the j-th memory unit (and/or the spare memory unit) 120-j to the first and x-th memory controllers 121-4 and 421-4.

The grades of the storage components 423-1 through 423-i of the j-th memory unit 423 in the spare memory unit 120-j may, for example, all be equal to, or less than the threshold value.

The first memory controller 121-4 may receive the request M4 and may reallocate (e.g., relocate) the first sector D1-1 of the first data D1 to the twelfth storage component 423-1. Then, the first memory controller 121-4 may transmit a completion signal to the system controller 110.

Accordingly, the first stripe Stripe 1 may be reconfigured into a first stripe Stripe 1'. In other words, the first stripe Stripe 1' may include the twelfth, sixth, and tenth storage components 423-3, 223-1, and 323-1. The grade sum of the first stripe Stripe 1' may be equal to, or less than the threshold value.

The data storage system according to some example embodiments of the present disclosure may check (e.g., periodically, continuously, on-demand, etc.) the grades of the storage components and may thus discover and reconfigure any stripe whose grade sum exceeds the threshold value. Accordingly, the reliability among the first through j-th memory units 120-1 through 120-j can be maintained.

The data storage system according to some example embodiments of the present disclosure can improve the reliability and/or performance of storing and maintaining data by reconfiguring any stripe with a reliability problem and/or performance problem based on grade information of storage components where data is stored.

A data storage system according to some example embodiments of the present disclosure will hereinafter be described with reference to FIGS. 1, 6, 7, 9, 12, and 13, avoiding redundant descriptions for clarity purposes.

Figure 12:
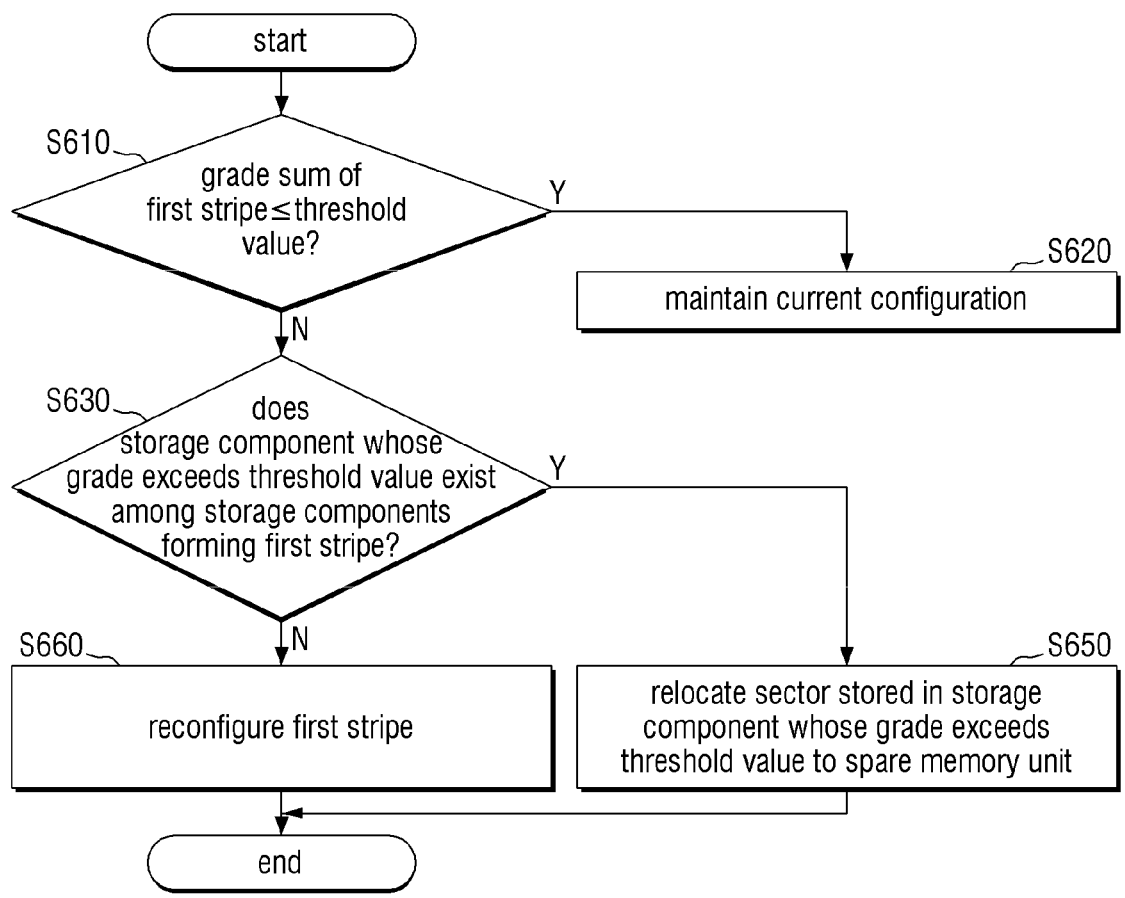
FIG. 12 is a flowchart illustrating how a data storage system according to some example embodiments of the present disclosure reconfigures a stripe.
Figure 13:
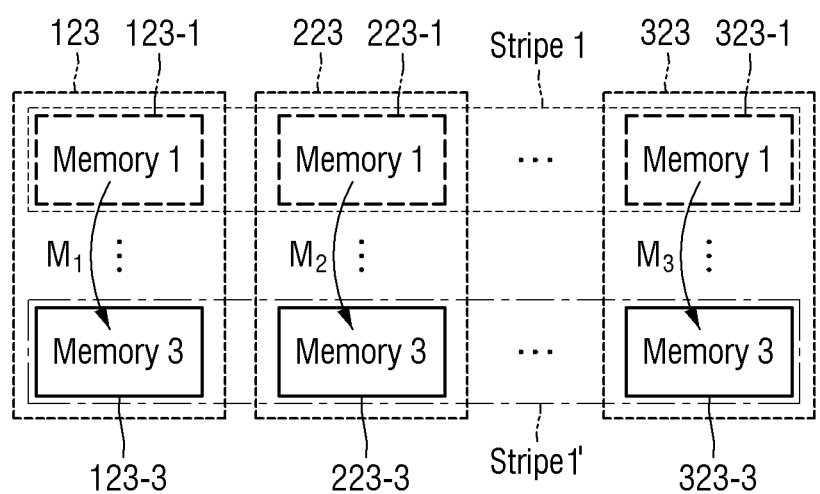
FIG. 13 illustrates how a data storage system according to some example embodiments of the present disclosure reconfigures a stripe.

FIG. 12 is a flowchart illustrating how a data storage system according to some example embodiments of the present disclosure reconfigures a stripe. FIG. 13 illustrates how a data storage system according to some example embodiments of the present disclosure reconfigures a stripe.

Referring to FIGS. 1, 6, 7, 9, 12, and 13, the system controller 110 may control the grade sum of each of a plurality of stripes stored in the data storage system according to some example embodiments of the present disclosure to be equal to, or less than, the threshold value, but the example embodiments are not limited thereto.

S610, S620, S630, and S650 of FIG. 12 may be the same as their respective counterparts of FIG. 9.

If the grade sum of the first stripe Stripe 1, which is one of the stripes stored in the data storage system according to some example embodiments of the present disclosure, exceeds the desired threshold value (N), the system controller 110 determines whether there exists a storage component whose grade exceeds the threshold value among the storage components forming the first stripe Stripe 1 (S630).

If there does not exist a storage component whose grade exceeds the threshold value among the storage components forming the first stripe Stripe 1 (N), the system controller 110 may reconfigure the first stripe Stripe 1 (S660), as illustrated in FIG. 13.

In some example embodiments, the system controller 110 may request that the first, second, and x-th memory controllers 121-4, 221-4, and 421-4 reallocate (e.g., relocate) all of the sectors assigned to the first data D1 from the fourth, sixth, and tenth storage components 123-1, 223-1, . . . , and 323-1 of the first stripe Stripe 1 to other storage components. The reallocation (e.g., relocation) of the sectors of the first data D1 may be performed only between the storage components of the same memory unit, but is not limited thereto, for example, the one or more of the sectors may be reallocated to a spare memory unit, a memory unit that is not included in the stripe, etc.

For example, the system controller 110 may send a request M1 for the reallocation (e.g., relocation) of the first sector D1-1 of the first data D1, which is stored in the fourth storage component 123-1, to the eighth storage component 123-3 to the first memory controller 121-4. Also, the system controller 110 may send a request M2 for the reallocation (e.g., relocation) of the second sector D2-1 of the first data D1, which is stored in the sixth storage component 223-1, to a ninth storage component 223-3 to the second memory controller 221-4. Also, the system controller 110 may send a request M3 for the reallocation (e.g., relocation) of the p1-th sector Dp1-1 of the first data D1, which is stored in the tenth storage component 323-1, to a eleventh storage component 323-3 to the x-th memory controller 421-4.

Grade information of the eighth, ninth, and eleventh storage components 123-3, 223-3, and 323-3 may be determined by the first, second, and x-th grading units and may already be transmitted to the system controller 110 by the first, second, and x-th memory controllers 121-4, 221-4, and 421-4. The grade of each of the eighth, ninth, and eleventh storage components 123-3, 223-3, and 323-3 may be equal to, or less than, the threshold value, and the sum of the grades of the eighth, ninth, and eleventh storage components 123-3, 223-3, and 323-3 may not exceed the threshold value.

The first, second, and x-th memory controllers 121-4, 221-4, and 421-4 may receive the requests M1 through M3 and may reallocate (e.g., relocate) the sectors of the first data D1. Then, the first, second, and x-th memory controllers 121-4, 221-4, and 421-4 may transmit a completion signal to the system controller 110.

Accordingly, the first stripe Stripe 1 may be reconfigured into a first stripe Stripe 1'. In other words, the first stripe Stripe 1' may include the eighth, ninth, and eleventh storage components 123-3, 223-3, and 323-3. The grade sum of the first stripe Stripe 1' may be equal to, or less than the threshold value.

A computing system including a data storage system according to some example embodiments of the present disclosure will hereinafter be described with reference to FIG. 14.

Figure 14:
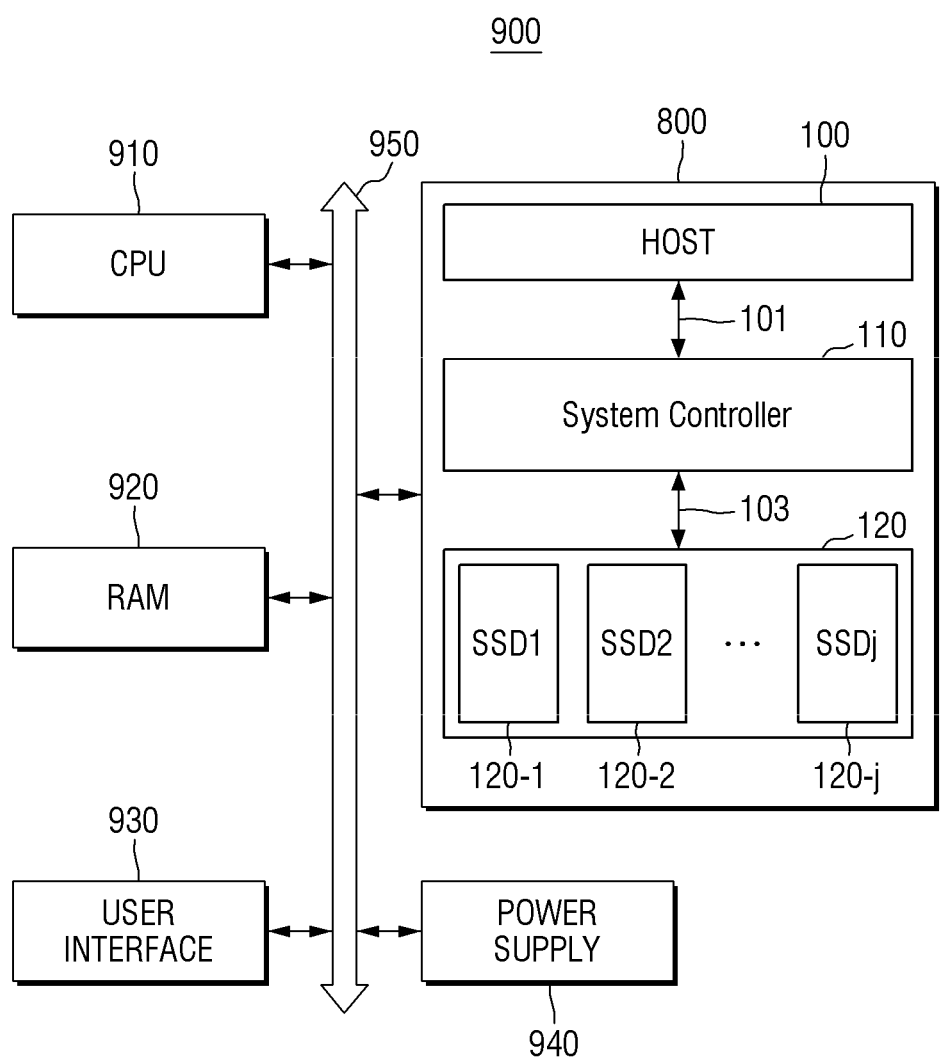
FIG. 14 is a block diagram of a computing system including a data storage system according to some example embodiments of the present disclosure.

FIG. 14 is a block diagram of a computing system including a data storage system according to some example embodiments of the present disclosure.

Referring to FIG. 14, a computing system 900 may include a central processing unit (CPU) 910, a RAM 920, a user interface 930, a power supply 940, and a data storage system 800.

The data storage system 800 may be a system in which the system controller 110 controls the memory unit group 120. The data storage system 800 may be electrically connected to the CPU 910, the RAM 920, the user interface 930, and the power supply 940 via a system bus 950. Data provided via the user interface 930, or processed by the CPU 910, may be stored in the data storage system 800.

The memory unit group 120 may be connected to the system bus 950 via the system controller 110, but the example embodiments are not limited thereto. For example, the memory unit group 120 may be connected directly to the system bus 950, the memory unit group 120 may be connected via a network to the system controller 110 and/or the CPU 910, etc.

As is traditional in the field of the inventive concepts, various example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar processing devices, they may be programmed using software (e.g., microcode) to perform various functions discussed herein and may optionally be driven by firmware and/or software, thereby transforming the microprocessor or similar processing devices into a special purpose processor. Additionally, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units, and/or modules without departing from the scope of the inventive concepts. Further, the blocks, units and/or modules of the embodiments may be physically combined into more complex blocks, units and/or modules without departing from the scope of the inventive concepts.

While various example embodiments of the present inventive concepts has been particularly shown and described with reference to example embodiments thereof, it will be understood by those of ordinary skill in the art that various changes in form and details may be made therein without departing from the spirit and scope of the present inventive concepts as defined by the following claims. It is therefore desired that the present example embodiments be considered in all respects as illustrative and not restrictive, reference being made to the appended claims rather than the foregoing description to indicate the scope of the invention.

What is claimed is:

1. A data storage system, comprising:
   a first memory device including a plurality of first storage components and a first memory controller, the first memory controller configured to control operation of the first storage components;
   a second memory device including a plurality of second storage components and a second memory controller, the second memory controller configured to control operation of the second storage components;
   a grading device configured to,
      determine a reliability grade for each of the first storage components as first grade information, and
      determine a reliability grade for each of the second storage components as second grade information,
      the determining the reliability grade for each of the first storage components and the determining the reliability grade for each of the second storage components are each based on reliability information related to the first storage components or the second storage components collected during read operations performed on the first storage components or the second storage components, respectively; and
   a system controller configured to,
      provide a write command for data comprising at least first and second sectors to the first memory controller and the second memory controller based on the first grade information and the second grade information, and
      determine a first location and a second location to write the first sector and the second sector, respectively, based on the first grade information, the second grade information, and a threshold value, the first grade information is a sum of score values of the grades associated with the storage components where the first sector is written, and
      the second grade information is a sum of score values of the grades associated with the second storage components where the second sector is written,
      receive updated first grade information and updated second grade information from the grading device,
      determine whether the updated first grade information and the updated second grade information exceed the threshold value, and
      in response to the updated first grade information and the updated second grade information exceeding the threshold value, determine whether the individual score value of each of the storage components associated with the first sector and the second sector exceed the threshold value.

2. The data storage system of claim 1, wherein
the grades of the plurality of the first storage components and the grades of the plurality of the second storage components are based on first through k-th grades, where k is a natural number, and the first through k-th grades have different score values from one another; and
each of the plurality of the first storage components and the plurality of the second storage components has one of the first through k-th grades.

3. The data storage system of claim 1, wherein
the system controller is further configured to allocate first data grade and second data grade to the first sector and the second sector, respectively, based on the first grade information and the second grade information;
the first memory controller is further configured to store the first sector in a third storage component of the plurality of the first storage components based on results of the determination of the first location to write the first sector;
the second memory controller is further configured to store the second sector in a fourth storage component of the plurality of the second storage components based on results of the determination of the second location to write the second sector;
a grade of the third storage component is the same grade as the first data grade of the first sector; and
a grade of the fourth storage component is the same as the second data grade of the second sector.

4. The data storage system of claim 1, wherein
the plurality of first storage components includes third and fifth storage components;
the plurality of second storage components includes fourth and sixth storage components;
the grading device is configured to determine grades of the third through sixth storage components; and the system controller is configured to receive grade information of the third through sixth storage components from the first and second memory controllers.

5. The data storage system of claim 4, wherein
the first memory controller is configured to write the first sector to the third storage component;
the second memory controller is configured to write the second sector to the fourth storage component; and
in response to a sum of the grades of the third and fourth storage components exceeding the threshold value, the system controller is configured to reallocate the first sector to the fifth storage component when a sum of the grades of the fifth and the fourth storage component is equal to, or less than the threshold value.

6. The data storage system of claim 4, wherein
the first memory controller is configured to write the first sector to the third storage component;
the second memory controller is configured to write the second sector to the fourth storage component; and
in response to a sum of the grades of the third and fourth storage components exceeding the threshold value, the system controller is configured to relocate the first sector to the fifth storage component and the second sector to the sixth storage component when a sum of the grades of the fifth and sixth storage components is equal to, or less than the threshold value.

7. The data storage system of claim 1, further comprising:
a third memory device including a plurality of third storage components and a third memory controller, the third memory controller is configured to control operation of the plurality of third storage components; wherein
the first memory controller is further configured to write the first sector to the first storage component, the second memory controller is further configured to write the second sector to the second storage component, and
in response to the grade of the first storage component exceeding the threshold value, the system controller is configured to reallocate the first sector to one of the plurality of the third storage components so that a sum of the grade of the one of the plurality of the third storage component where the first sector is reallocated and the grade of the second storage component is equal to, or less than the threshold value.

8. A data storage system, comprising:
a first memory device including a plurality of first storage components and a first memory controller, the first memory controller configured to control operation of the plurality of first storage components;
a second memory device including a plurality of second storage components and a second memory controller, the second memory controller configured to control operation of the plurality of second storage components;
a grading device configured to,
determine reliability grades of each of the plurality of the first storage components, and
determine reliability grades of each of the plurality of the second storage components,
the determining the reliability grade for each of the first storage components and the determining the reliability grade for each of the second storage components are each based on reliability information related to the first storage components or the second storage components collected during read operations performed on the first storage components or the second storage components, respectively; and a system controller configured to,
transmit a write command for first data to the first memory controller and the second memory controller by allocating first and second grades to first and second sectors, respectively, of the first data, wherein
the first memory controller is further configured to,
receive the write command, and
write the first sector to a storage component with the first grade among the plurality of the first storage components; and
the second memory controller is further configured to,
receive the write command, and
write the second sector to a storage component with the second grade among the plurality of the second storage components; and
the system controller is further configured to determine whether the sum of the grades of the storage components associated with the first sector and the second sector exceed a threshold value, and in response to the sum of the grades of the storage components associated with the first sector and the second sector exceeding the threshold value, the system controller is further configured to determine whether an individual score value of each of the storage components associated with the first sector and the second sector exceeds the threshold value.

9. The data storage system of claim 8, wherein
in response to the sum of the first and second grades being equal to, or less than, a threshold value, the system controller is further configured to maintain a current configuration of the first sector and the second sector.

10. The data storage system of claim 8, wherein
the grades include first through k-th grades, where k is a natural number;
the first through k-th grades have different scores from one another;
each of the plurality of the first storage components and the plurality of the second storage components has one of the first through k-th grades; and
the sum of the first grade and the second grade is a sum of the scores of the first grade and the second grade.

11. The data storage system of claim 8, wherein
the plurality of first storage components includes third and fifth storage components;
the plurality of second storage components includes fourth and sixth storage components; and
a sum of the grades of the fourth and sixth storage components is equal to, or less than a threshold value.

12. The data storage system of claim 8, wherein
the plurality of second storage components includes a sixth storage component;
the plurality of the first storage components includes fourth and seventh storage components, and a third sector of the first data is stored on the fourth storage component; and
in response to the grades of the fourth and sixth storage components exceeding a threshold value, the system controller is configured to reallocate the third sector to the seventh storage component when a sum of the grades of the sixth and seventh storage components is equal to, or less than the threshold value.

13. The data storage system of claim 8, wherein
the first storage components includes fourth and seventh storage components, and a third sector of the first data is stored on the fourth storage component;

the second storage components includes sixth and eighth storage components, and a fourth sector of the first data is stored on the sixth storage component; and in response to the grades of the fourth and sixth storage components exceeding a threshold value, the system controller is configured to reallocate the third sector to the seventh storage component and the fourth sector to the eighth storage component when a sum of the grades of the seventh and eighth storage components is equal to, or less than the threshold value.

14. A data storage system comprising:
a plurality of solid state drives (SSDs) configured in a RAID system, the plurality of SSDs each including a plurality of semiconductor chips;
at least one sensing circuit configured to determine reliability information associated with each of the semiconductor chips of the plurality of solid state drives in response to read operations performed on each of the plurality of semiconductor chips;
at least one grading circuit configured to determine a reliability grade for each of the plurality of semiconductor chips based on the reliability information associated with each of the plurality of semiconductor chips; and
a system controller configured to,
write data associated with at least one RAID stripe to the plurality of semiconductor chips based on a desired total reliability grade for the plurality of semiconductor chips,
determine updated reliability grades of the data storage locations of the written data associated with the at least one RAID stripe,
determine whether the sum of the updated reliability grades of the data storage locations of the written data associated with the at least one RAID stripe exceeds the desired total reliability grade for the written data, and
determine whether the updated reliability grades of each individual data storage location of the written data associated with the at least one RAID stripe exceeds the desired total reliability grade for the written data.

15. The data storage system of claim 14, wherein the data associated with the at least one RAID stripe is written to at least two semiconductor chips located on two or more of the plurality of SSDs.

16. The data storage system of claim 14, wherein the writing of the data associated with the at least one RAID stripe includes:
determining reliability grades of potential data storage locations from the plurality of semiconductor chips;
selecting data storage locations to write the data to from the potential data storage locations based on the reliability grades of the potential data storage locations and the desired total reliability grade; and
writing the data associated with the at least one RAID stripe to the selected data storage locations.

17. The data storage system of claim 14, wherein
the at least one sensing circuit is configured to determine the reliability information associated with each of the semiconductor chips based on input/output (I/O) operations performed by each of the semiconductor chips; and
the at least one grading circuit is configured to periodically update the reliability grade for each of the plurality of semiconductor chips.

18. The data storage system of claim 17, wherein the system controller is further configured to:
reallocate the written data associated with the at least one RAID stripe based on results of the determination of whether the updated reliability grades of the data storage locations of the written data exceeds the desired total reliability grade for the written data.

* * * * *